(12) United States Patent
Rand

(10) Patent No.: US 6,223,927 B1
(45) Date of Patent: May 1, 2001

(54) VENTILATED CONTAINER

(76) Inventor: Richard John Rand, 2 The Hollies, Ashvale, Chiddingford Godalming, Surrey, GU8 4RE (GB)

(*) Notice: Subject to any disclaimer, the term of this patent is extended or adjusted under 35 U.S.C. 154(b) by 0 days.

(21) Appl. No.: 09/446,789
(22) PCT Filed: Jun. 30, 1998
(86) PCT No.: PCT/GB98/01899
  § 371 Date: Dec. 27, 1999
  § 102(e) Date: Dec. 27, 1999
(87) PCT Pub. No.: WO99/01361
  PCT Pub. Date: Jan. 14, 1999

(30) Foreign Application Priority Data

Jun. 30, 1997 (GB) .................................................. 9713649
Mar. 20, 1998 (GB) .................................................. 9806059

(51) Int. Cl.⁷ ................................................ B65D 90/00
(52) U.S. Cl. ................................... 220/495.06; 220/908.1
(58) Field of Search ........................ 220/495.04, 495.06, 220/495.11, 495.08, 908.1

(56) References Cited

U.S. PATENT DOCUMENTS

| | | |
|---|---|---|
| 1,613,621 | 1/1927 | Oke . |
| 4,630,752 * | 12/1986 | DeMars ........................ 220/908.1 X |
| 4,660,758 | 4/1987 | Tavel et al. ......................... 232/43.2 |
| 4,834,260 * | 5/1989 | Auten ........................... 220/908.1 X |
| 4,867,328 * | 9/1989 | McCarthy .................. 220/495.08 X |
| 5,031,796 | 7/1991 | Schäfer et al. ........................ 220/571 |
| 5,065,886 | 11/1991 | Sher ..................................... 220/331 |
| 5,156,290 | 10/1992 | Rodrigues ........................... 220/87.1 |
| 5,295,606 * | 3/1994 | Karwoski ..................... 220/495.06 X |
| 5,388,717 * | 2/1995 | LeVasseur ....................... 220/495.06 |
| 5,571,582 | 11/1996 | Katoh .................................. 428/35.5 |
| 5,803,303 * | 9/1998 | Timm et al. .................... 220/495.04 |

FOREIGN PATENT DOCUMENTS

| | | |
|---|---|---|
| 93 02 477 | 9/1993 | (DE) . |
| 195 09 463 A1 | 10/1995 | (DE) . |
| 0 439 140 A1 | 7/1991 | (EP) . |
| 0 501 028 A1 | 9/1992 | (EP) . |
| 0 538 579 A1 | 4/1993 | (EP) . |
| 947781 | 1/1964 | (GB) . |
| 1105706 | 3/1968 | (GB) . |
| 2 251 781 | 7/1992 | (GB) . |
| 2 252 032 | 7/1992 | (GB) . |
| 2 269 103 | 2/1994 | (GB) . |
| WO 95/01294 | 1/1995 | (WO) . |
| WO 97/07036 | 2/1997 | (WO) . |

* cited by examiner

Primary Examiner—S M Pollard
(74) Attorney, Agent, or Firm—Lahive & Cockfield, LLP

(57) ABSTRACT

The invention provides a container (1) comprising an outer receptacle (2) and, disposed therein, an inner receptacle (6) in the form of a bag; the bag being permeable to gases; the outer receptacle having a plurality of spacers (8) extending inwardly from an inner surface (9) thereof, and a plurality of vents (10) in the walls (9) of the outer receptacle (2); the spacers (8) serving to support the inner bag (6) such that it is spaced apart from the inner surface (9) of the outer receptacle (2); and the vents (10) serving to allow air to circulate between the bag (6) and the outer receptacle (2).

21 Claims, 10 Drawing Sheets

VENTILATED CONTAINER

The present invention relates to a container, and in particular to a container for use in the collection and storage of materials.

A major problem facing most communities is the problem of waste disposal. Each day vast quantities of waste are created, and such waste must be removed and processed in a safe and hygienic manner.

For waste materials storage and collection, the main choices open other than disposal of the waste are either incineration to generate energy, or separation of the waste material into fractions for recycling or composting or anaerobic digestion. In order to help encourage the co-operation of householders and other generators of waste materials to separate waste at source in a way which helps the processor of the waste to produce what the market demands, many local authorities now provide outside waste material collection bins.

Organic waste presents particular problems due in large part to the high moisture content of the waste. In warmer weather conditions, unless the waste is adequately vented, unpleasant odours can build up quickly as anaerobic conditions are set up in the waste collection bins.

The cost of collection of waste materials can be significant and one option open to waste collection authorities to reduce the cost of collections is to reduce the frequency of the collections. However, it will be appreciated that if the waste is left for longer periods, odour levels can become unacceptably high.

In addition to the problem of anaerobic decomposition, a further problem facing the collector of waste materials is the problem of infestation by vermin, insects and other small creatures.

There have been a number of disclosures by others relating to waste collection or storage bins providing an aerobic environment but such bins are considered to have significant limitations as to their usefulness and effectiveness.

European Patent Application No. 92610025 discloses a rubbish bag holder which requires a specially designed cart to transport the holder to a collection vehicle for emptying. One consequence of this is that the bag cannot be used with existing collection vehicle lifting gear generally in use in many areas. Moreover, the time taken for a contractor to empty the bag holder and move onto the next is greater than if the bag holder has its own wheels.

WO-A-95/01294 discloses a rather complicated arrangement which consists of an outer receptacle, an inner perforated supporting bag, and, within the supporting bag, an inner paper bag. In the more complex, and seemingly preferred, arrangements disclosed in WO-A-95/01294, there is additionally an inner insert container in the form of a laundry-basket like arrangement thus making a total of four nested containers in total.

U.S. Pat. No. 5,031,796 discloses a ventilated waste container, containing several relatively small arrays of vent holes at the upper and lower ends of the container. The container has vertical ribs which protrude inwardly from the walls of the container to function as spacers, the intention being that the spacers should prevent waste within the container coming into close contact with walls. However, the container of U.S. Pat. No. 5,031,796 is not specifically designed for use with inner liner bags, and as a consequence, the spacers would only be of value for a narrow range of materials. Along with the spacers, the use of a grate on which the material is to be disposed also limits the range of material which can be deposited in the container, requiring the avoidance of cooked food and other material reduced to small fragments. The aim is only to deposit material which will not fall through the grate or prevent/limit the migration of air through or round the material, thus encouraging the development of anaerobic conditions.

It is an object of the present invention to provide an outer receptacle or container which can be used to contain an air permeable inner liner, such as a paper sack, in a manner which provides for effective venting and air circulation between the outer container and the inner liner.

it is a further object of the invention to provide a container which is of relatively simple construction and is therefore relatively inexpensive and easy to fabricate.

Accordingly, in a first aspect, the invention provides a container comprising an outer receptacle and, disposed therein, an inner receptacle in the form of a bag, the bag being permeable to gases, the outer receptacle having a plurality of spacers extending inwardly from an inner surface thereof, and a plurality of vents in the side walls and/or the base of the outer receptacle, the spacers serving to support the inner bag such that it is spaced apart from the inner surface of the outer receptacle, and the vents serving to allow air to circulate between the bag and outer receptacle.

The container can be a container intended for use in the temporary storage of waste materials, such as household, domestic, business or industrial waste, but it can also be used for the storage of other materials which would benefit from the improved ventilation properties of the invention.

The purpose of the vents and spacers inter alia is to ensure that there is sufficient air movement between the outer and inner receptacles to avoid setting up anaerobic conditions. The shape, configuration, frequency and dimensions of the spacers and vents can vary according to the particular circumstances in which the container is to be used, and can depend for example on the number of air changes required for a given set of temperature assumptions, the nature of the material or product contained in the bag, and the specification of the bag.

The vents typically are provided adjacent at least 10% and more usually at least 25% of the spacers, and preferably are provided adjacent at least 30%, for example at least 50%, and most preferably at least 75%, e.g. up to 100% of the spacers.

The vents typically are elongate in form and can be, for example, arranged in a plurality of substantially horizontal or vertical rows around the outer receptacle. Advantageously there are at least two and preferably at least three such rows. The rows can be parallel with respect to each other, and can be disposed such that the vents are in substantially vertical or horizontal alignment. Alternatively, the rows can be staggered.

Horizontally adjacent spacers can have a single vent therebetween, or a plurality of vents, for example two, three or four vents. The number of vents disposed between the pairs of adjacent spacers around the wall of the outer receptacle can the same for all spacers, or can differ.

In one embodiment, the side walls have no vents, but instead the vents are located at the base of the outer receptacle, as described below.

In another embodiment, the vents are arranged in rows at regular spacings down the height of the outer receptacle.

In a still further embodiment, vents are located only on the base and at the upper end of the side walls of the receptacle.

In each of the aforesaid embodiments, the numbers and positions of the vents, as well as their shape and size, are typically chosen so as to permit free flow of air, by convection currents, from the bottom of the container to the top. Thus, although it is preferred that the side wall should contain vents, it is possible to omit vents from at least the lower ends of the side walls provided that the base is adequately vented and vents are provided at the upper end of the side wall and/or on any lid. It is most preferred however that any vents at the upper end of the container are on the side wall rather than on the lid, so at reduce the opportunities for ingress of rain water and pests such as flies.

The vertical distance between rows of vents can be, for example, between 0.1 and 3 times (for example from 0.25 to 2 times) the height of each vent in a pair of vertically adjacent rows. Where the vents in vertically adjacent rows are of differing height, the vertical distance between them, as defined above, refers to the average height of the vents.

The horizontal distance between adjacent vents in a row of vents can be, for example, between 1 and 50 times the width of the vent, for example between 2 and 25 times the width of the vent. Where adjacent vents of are of different width, the definition of the horizontal distance between them set out above refers to the average width of the relevant two adjacent vents.

The spacers can be in the form of elongate ribs. The configuration and arrangement of the spacers is preferably such that, together with the inner surface of the outer receptacle and the outer surface of the inner receptacle or bag, elongate ducts are created which serve to channel convection currents between the inner and outer receptacles.

The elongate spacers preferably extend in a substantially upwards direction, and most preferably are substantially vertical. Consequently, the ducts formed by the spacers extend in a substantially upwards and preferably substantially vertical direction.

The spacers can extend upwardly without interruption, from a location at or adjacent the lower end of the container, or there can be discontinuities in the spacers. Such discontinuities enable lateral movement of air currents as well as movement in an ascending or descending direction. Moreover, by making the spacers, and hence the ducts, relatively short, resistance to air movement through the ducts can be minimised.

Where the spacers are discontinuous, they can be, for example, arranged in a plurality of substantially horizontal rows around the inner surface of the outer receptacle. For example, there can be at least two such horizontal rows, e.g three or more such rows. The rows can be parallel with respect to each other, and can be disposed such that the spacers are in substantially vertical alignment. Alternatively, the rows can be staggered.

Vents can be present between the spacers in all rows, or only some of them, or none of them. For example, where the spacers are arranged in a plurality of rows, vents may be located between the spacers in only the uppermost row, or the uppermost two rows (where there are more than two rows).

In accordance with the invention, an even flow of air through the container between the bag and the inner face of the outer receptacle can be achieved by ensuring that the resistance to flow of air through the air ducts balances the resistance to flow of air through the vents through which the air moves out of the container. The resistance to air flow through the ducts can be controlled by controlling the dimensions of the spacers, and the distances between them. For example, in order to reduce resistance to air flow, the spacers can be made shorter and/or the distances between adjacent spacers increased and/or the depth of the spacers (i.e. the distance by which they protrude inwardly) can be increased. However, this must balanced against the requirements imposed by the material from which the bag is made and/or the materials which are to be contained in the bag. By ensuring that the amount of support given by the spacers takes into account the properties of the bag and contents of the bag, bulging of the bags into the ducts required for ventilation is minimised to avoid a restriction in the flow of air.

By way of example, the spacers can be from 0.25 cm to 15 cm apart and can have a depth of from 0.25 cm to 8 cm, the term "depth" referring to the distance by which the spacers protrude inwardly from the walls of the container. Thus the ducts created between the inner and outer receptacles can have a cross sectional area of, for example, 0.06 $cm^2$ to 120 $cm_2$. The spacers can have a width varying from, for example, 0.25 cm to 5 cm.

The ventilation system defined by the arrangement of spacers and vents set out above stimulates an air flow through the container by harnessing the natural convection of air within the container set up by temperature gradients between the outer receptacle and the inner receptacle bag and between the top and bottom of the container, or by the heating or cooling of the container to temperatures different from that of the surrounding air by, for example, solar radiation. By regulating, for example, the length of the columns of air in the ducts formed by the inside face of the container, spacers and inner receptacle, or the cross-sectional area and shape of the column of air, and the colour and finish of the container, it is possible to design the ventilation system to provide a given number of air changes per period of time for a given set of temperature conditions in and outside the container.

In order to take advantage of the effect of solar radiation on the temperature of the container, and hence the rate of convection, the colour and finish of the outer and inner receptacle can be varied. For example, in order to increase radiation absorption, the outer and/or the inner receptacle can be provided in dark colour, e.g. black.

An advantage of the ventilation system of the invention is that the air movement does not rely on either mechanical means of forcing air through the container, movement of air outside the container, or a heat source provided by the contents, and in this respect, the invention is distinguished from the prior art cited above. Nevertheless, by positioning the vents in the sides, the container is also designed to facilitate an even air flow through the ducts around the hole container by forced convection when windy conditions prevail, and also to take advantage of a heat source if provided by the contents or other means to generate air movement by convection.

A further advantage of the present invention is that it does not require any intervening structure (other than the spacers) between the outer and inner receptacles. In this respect, the invention is further distinguished from the container disclosed in WO-A-95/01294 which requires a reusable permeable supporting bag, and preferably also a "laundry basket" type structure between the outer receptacle and the paper sacks in which the household waste is actually carried.

In order to assist convective air flow from the bottom of the container to the top, the outer receptacle typically is provided with a base having at least one vent and more usually a plurality of vents therein.

The vents can be of any size or shape consistent with the requirement for structural integrity, but preferably are sized so as to prevent the ingress of rodents or other unwanted intruders. The vents can be, for example, circular or non-circular, for example of elongate or slotted form, or of ovoidal or polygonal (regular or irregular) form. The vents can be for example from 4 mm to about 8 mm in width or diameter, in circumstances where it is desired to prevent the ingress of rodents. In circumstances where ingress of rodents is not a problem, the size and shape of the vents in the base will depend on inter alia the structural integrity of the container and/or the level of support required for the inner receptacle or bag.

The base of the outer receptacle can be formed integrally with the side walls, for example in a single moulding, or it can be formed separately. Where it is formed separately, it can take the form of a grating or grid or an insert (preferably vented) which rests in, or is secured in, the lower end of the outer receptacle. Thus, the lower end of the receptacle can be provided with a ledge or other support surface upon which the grid can rest. Alternatively, or additionally, a false bottom can be provided in the outer receptacle in the form of an insert, grid or grate, which can be fixed permanently in place or constructed so as to be removable.

The resistance of air flow at the bottom of the container is minimised by providing as large an area of vents as is possible, consistent with maintaining the structural integrity of the container, and prevent access of rodents and other living things. For example, the area of the vents can be from up to 95% (for example 10% to 95%), typically 20% to 80%, more usually up to 70% of the total area of the base, e.g. from 40% to 60%.

The lower end of the outer receptacle can be provided with means for spacing the base from an underlying surface so as to prevent obstruction of the vents by the underlying surface. The means for spacing the base from the underlying surface can take the form of, for example, a wheel or wheels and/or a leg or legs.

It is preferred that the top of the container will have a lid which may have vents, or a rain-proof cowl to draw air through the container, or other ventilation means. The lid is preferably hingedly connected to the outer receptacle. In one embodiment, the lid comprises a plurality (e.g. a pair) of lid members, each hingedly connected to the outer receptacle.

The outer receptacle can contain one bag or a plurality of bags. Where the containment of multiple bags is envisaged, the outer receptacle can be provided with dividers for dividing the interior of the receptacle into compartments, each compartment being intended to contain one or more inner receptacles or bags.

The or each bag can be formed from a paper material, or a permeable polymeric or composite material, for example. The bag can contain a liner or have a surface (e.g. the inner surface) treated (e.g. coated) to alter its strength and/or permeability characteristics to enable it to contain certain types of material more efficiently. The bag can be formed from a material such as paper or another material which is inherently permeable, or it can be formed, for example, from an impermeable material which has been perforated (preferably microperforated or fibrillated) to give it the necessary permeability. One example of such a material is a needled plastics (e.g. polyethylene) film. It will be appreciated that the bag will be formed from a material which is appropriate for the circumstances of its use, and for example the characteristics and structural features of the outer receptacle. Thus, for example, if the bag is to be formed from a relatively weak material, or a material such as recycled paper which has reduced structural integrity upon wetting, the outer receptacle typically will need to provide a greater degree of support to the bag, in terms of numbers and densities of the spacers, than would be required for a relatively durable material such as a Kraft paper.

The bag can be permeable to liquids (such as water), and most preferably is permeable to liquids in vapour form, such as water vapour. The liquid and/or vapour permeability can be unidirectional or bidirectional. Where the permeability is unidirectional, it is typically oriented such that liquid and/or vapour passes from the interior of the bag to its exterior. When a permeable bag is filled with moisture laden organic waste, for example, the outer surface of the bag will become wet, but the shedding of liquids from the bag can generally be avoided by the drying properties of air migrating through the container between the outer receptacle and the bag.

The bag can also be permeable to hydrocarbons, either undirectionally or bidirectionally as aforesaid in relation to liquids and vapours in general.

It will be appreciated from the foregoing that the properties of the inner receptacle which can be exploited include the ability of vapours, gases and liquids to migrate through the inner receptacle, either in both directions, or unidirectionally. Variation in the structural strength of the bags available can be accommodated by varying the amount of support given by the spacers. For example, a paper sack of a given weight and specification of paper containing damp compostable organic waste will require more support from spacers in keeping the surface of the sack away from the inside faces of the outer receptacle than a similar sack containing a dry product of similar weight distribution.

The outer receptacle of the container preferably has suspension means for securing the inner receptacle to an upper end thereof. The suspending means is preferably arranged to hold the inner receptacle or bag in an open configuration. Alternatively, or additionally, the base of the container can be provided with one or more spacer elements for supporting the bag. The spacer(s) can take the form of a platform for supporting the bag. Where the base of the outer receptacle is vented, it is preferred that any such platform is constructed so as not to interfere substantially with the movement of air up through the container. In one embodiment, the lower end of the container can be provided with a tray (e.g. a removable tray) for collecting liquids seeping from the inner receptacle or bag.

In order to assist movement of the container, the outer receptacle is preferably provided with means defining a handle or other formation to enable the container to be lifted or moved.

In addition to the combination of inner and outer receptacles, the invention also relates to the outer receptacles per se.

It is envisaged that the containers of the invention will find application not only in the storage, management and collection of waste materials, but also in other fields in which the protection of moisture sensitive materials is considered desirable, for example in the fields of textiles, food, chemicals and pharmaceutical and bulk materials, and in particular fields in which the protection of the contents, and the handlers of the containers, is of importance. In the field of waste management, the container can be for example, a domestic waste container of the "wheelie bin" or "dustbin" variety, intended for use outdoors, or it can be for example a kitchen waste bin.

One further problem facing users of waste containers and, indeed, waste collection contractors, is the problem of infestation of the waste with insects and small creatures. In order to overcome or avoid this problem, either the outer receptacle or the bag, or both, can be provided with means for repelling and/or killing insects and small creatures. For example, the inner bag can be dipped, sprayed, painted, coated or impregnated with a suitable composition for repelling and/or killing insects and small creatures. Such compositions can be example chosen from organophosphorus compounds, or the pyrethroids, or compounds such as diethyltoluamide, or essential oils, or larvicidal compounds such as cyromazine.

Instead of, or in addition to, treating the inner bag with compounds or compositions for repelling and/or killing insects and small creatures, the outer receptacle can be provided with means for holding or dispensing such compositions or compounds. For example, a suitable holder can be mounted on the underside of the lid of the outer receptacle; an advantage of this arrangement being that it deters flies and other pests from entering the container as the lid is lifted. The holder can contain a matrix or substrate containing or coated with a suitable repellant or insecticidal composition. Alternatively, or additionally, a suitable holder can be mounted on, or incorporated into the side walls or base of the outer receptacle, preferably in the lower part (e.g. lower third) of the outer receptacle.

It is envisaged that the provision of a holder or dispenser secured to the underside of the lid of a waste container, or to the side walls or base of the container will be generally applicable to waste containers and indeed containers in general, and not merely to the containers of the present invention. Accordingly, in a further aspect, the invention provides a container (e.g. a waste container) having a main container body and a lid, preferably hingedly mounted thereon, the lid or the main container body, or both, having mounted thereon, or having incorporated therein, a holder or support containing or bearing a composition for repelling and/or killing insects or small creatures.

Such compositions can be example chosen from organophosphorus compounds, or the pyrethroids, or compounds such as diethyltoluamide, or essential oils, or larvicidal compounds such as cyromazine.

The invention will now be illustrated by way of example by reference to the particular embodiments shown in the accompanying drawings of which:

Figure 1:
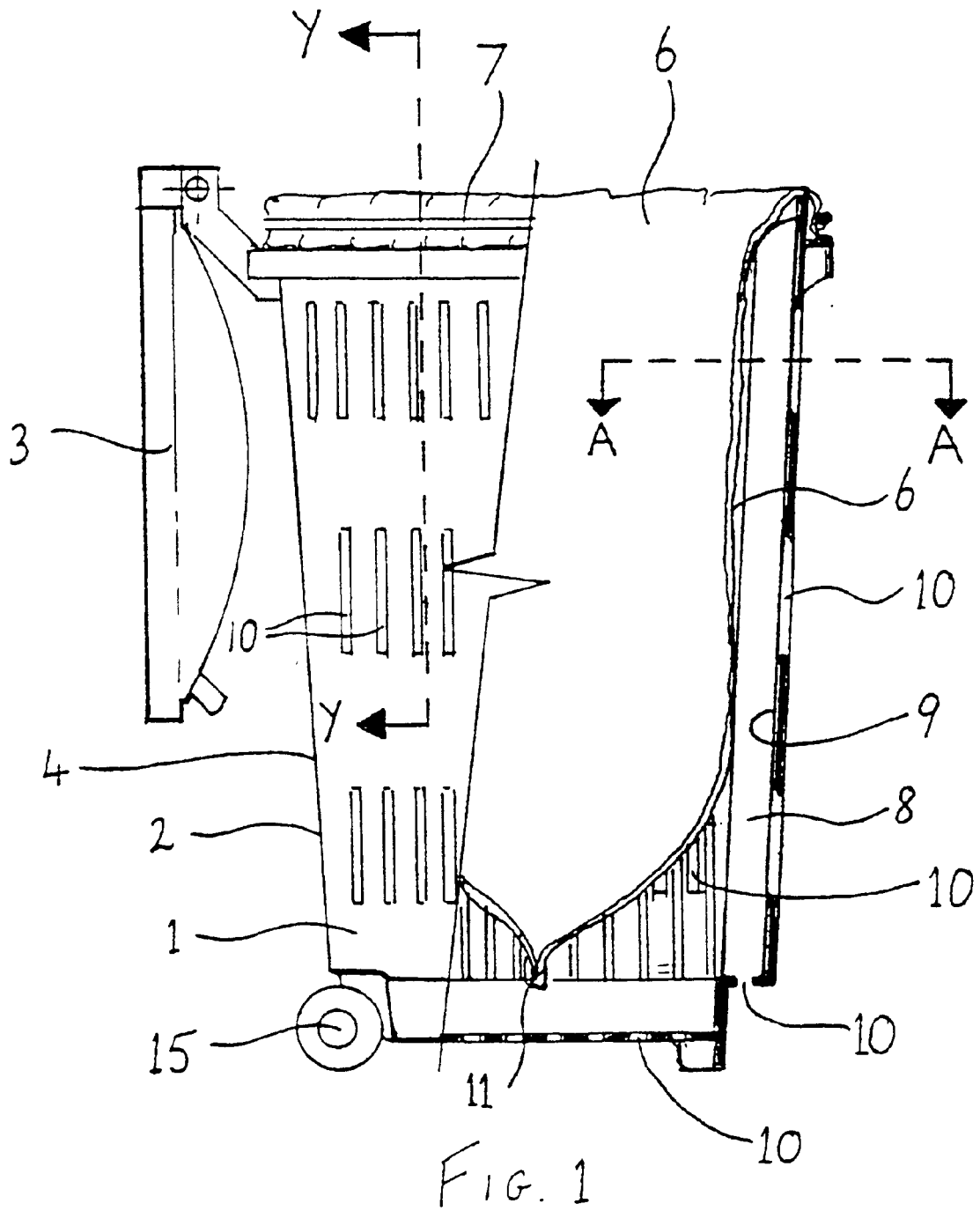
FIG. 1 shows a cut-away diagram of the outer receptacle in a wheeled bin configuration, in which the bag is suspended in the outer receptacle.
Figure 3:
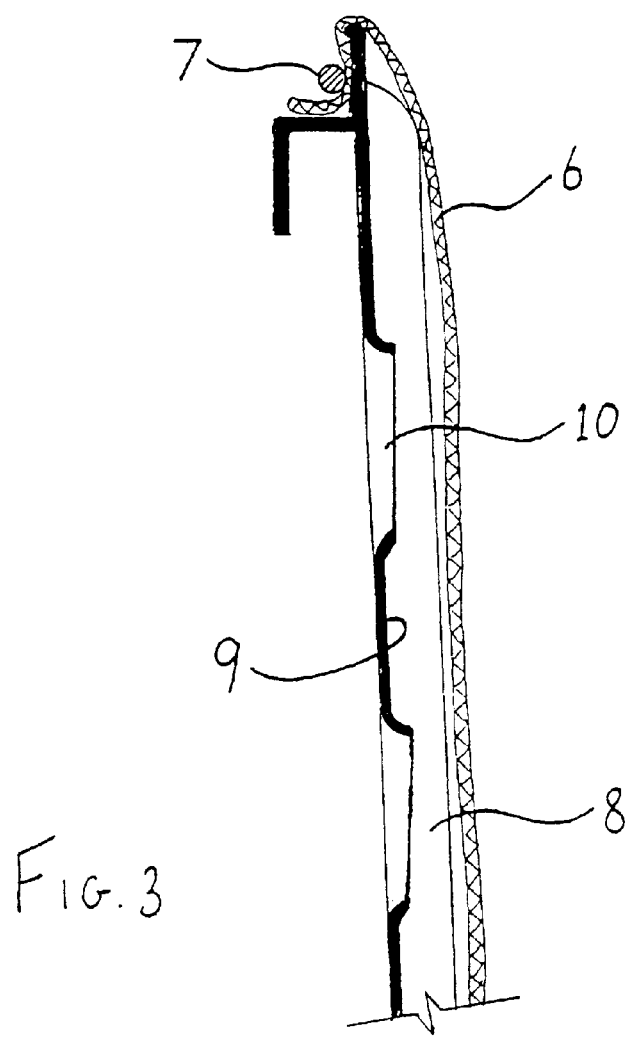
Figure 4:
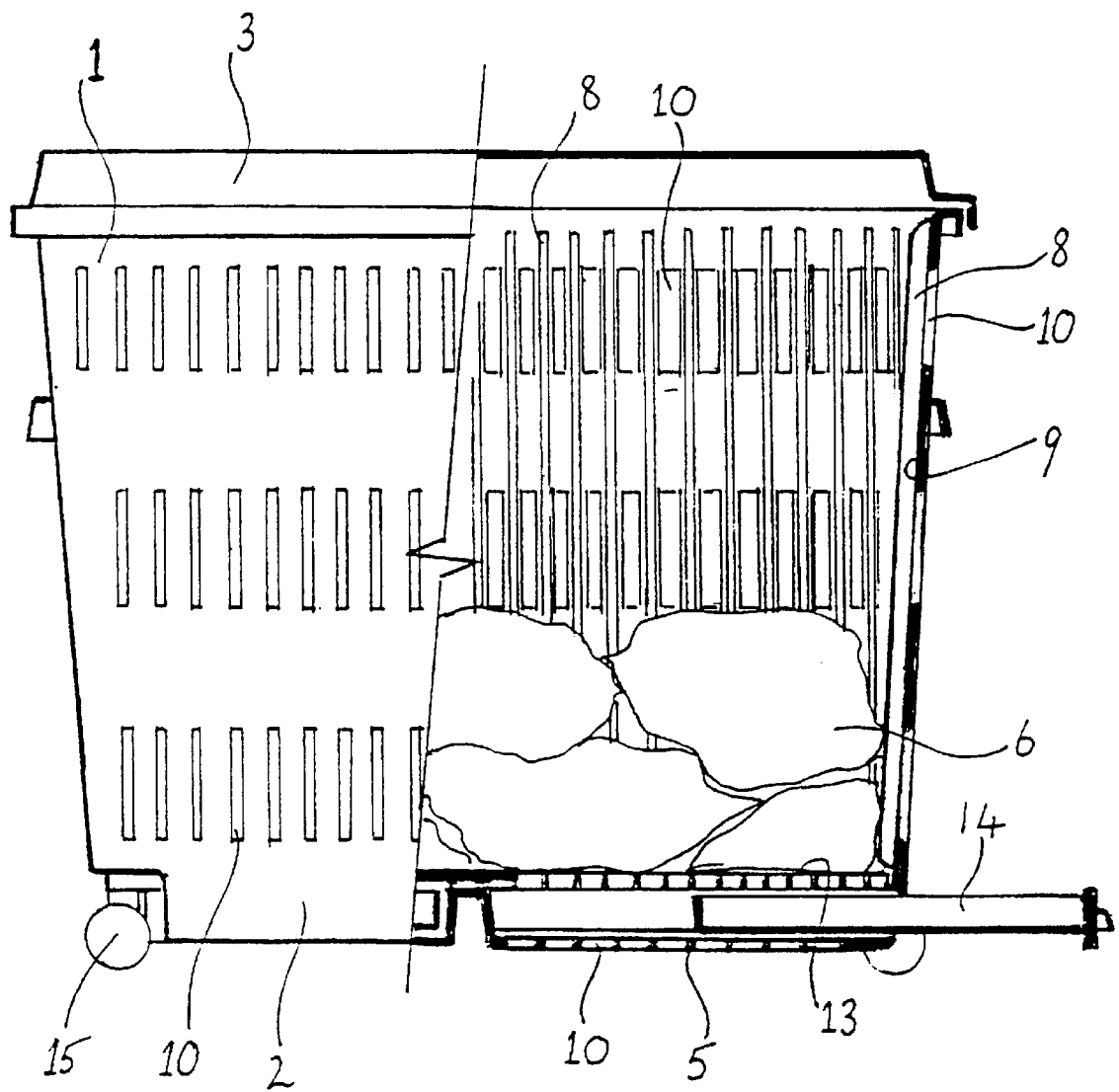
Figure 5:
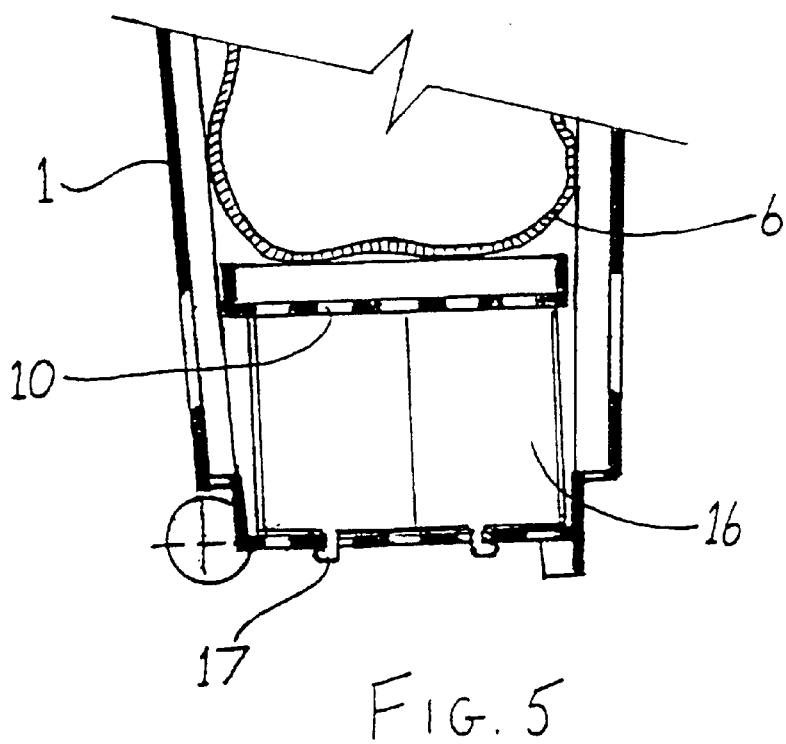
Figure 6:
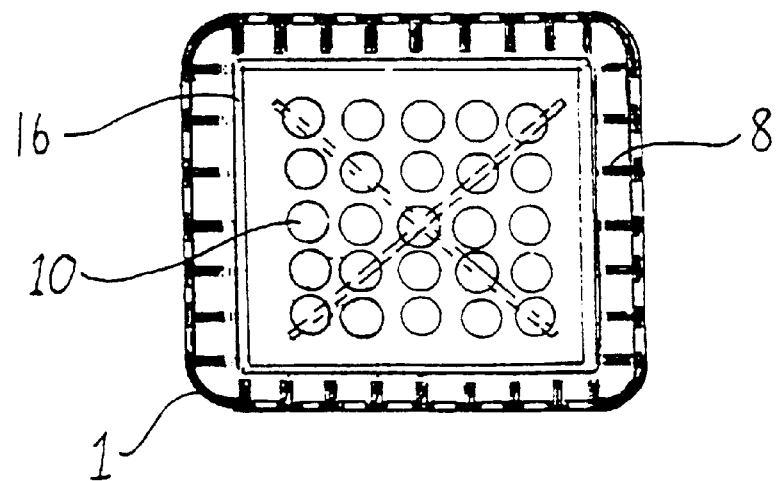
Figure 7:
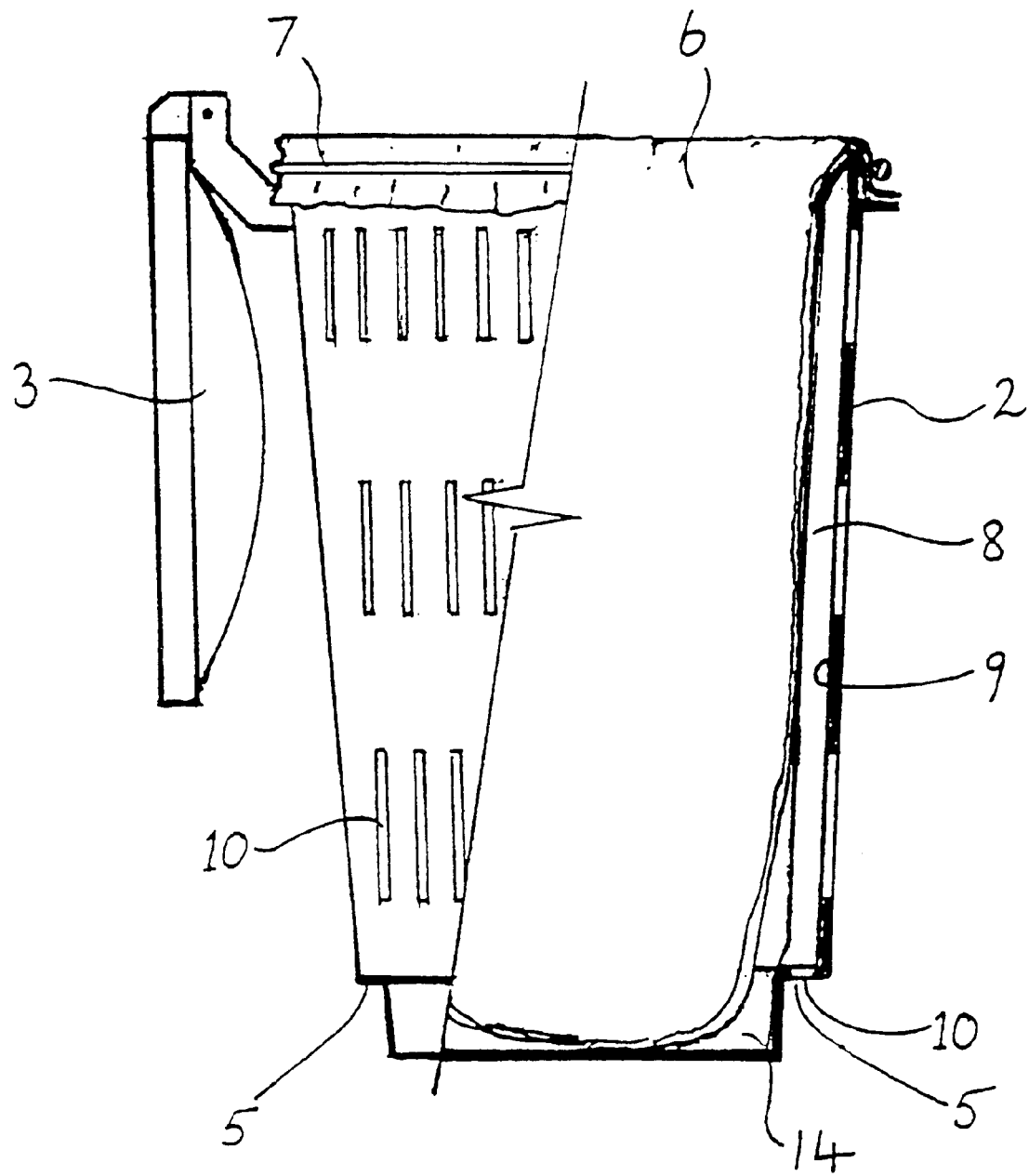
Figure 9:
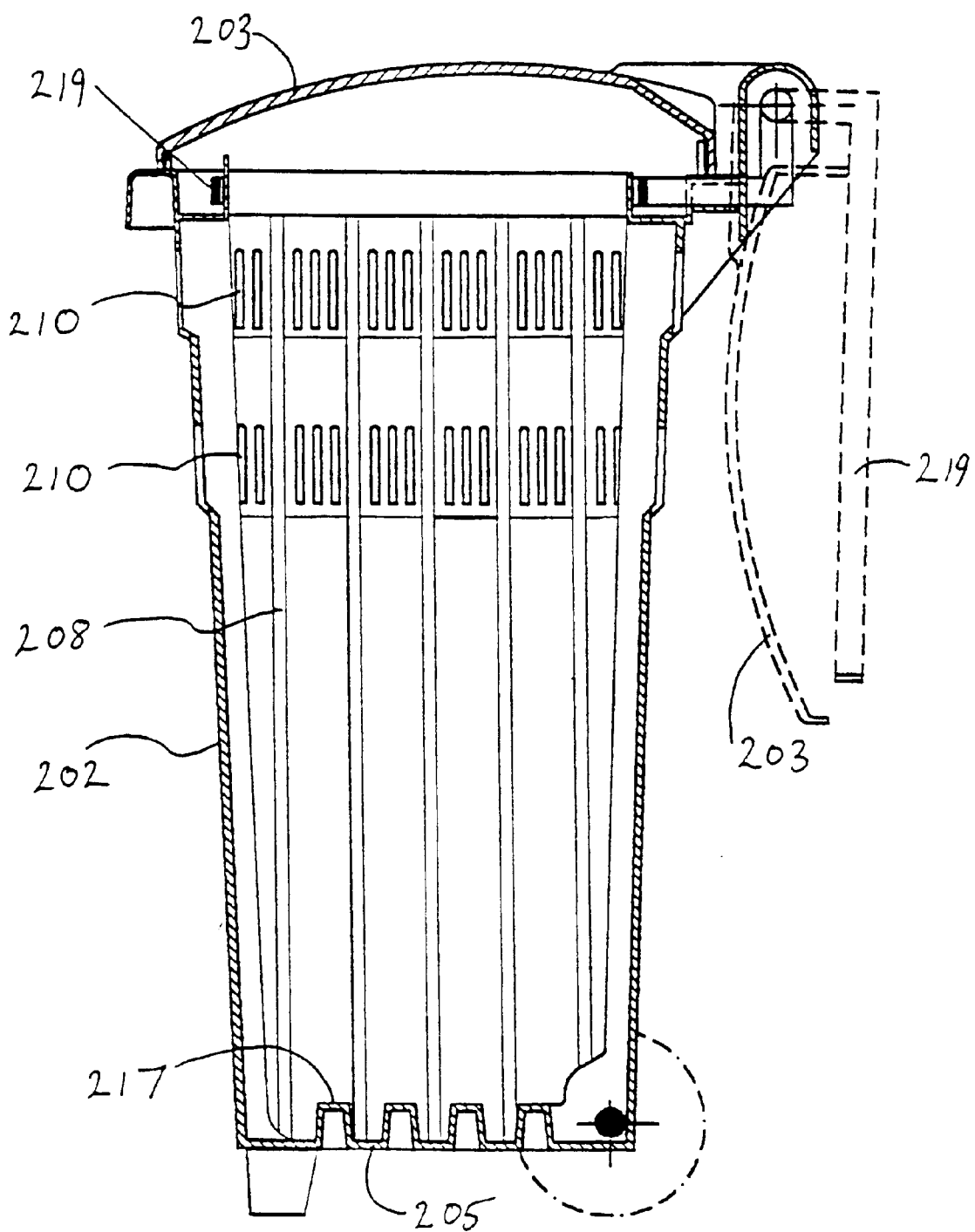
Figure 10:
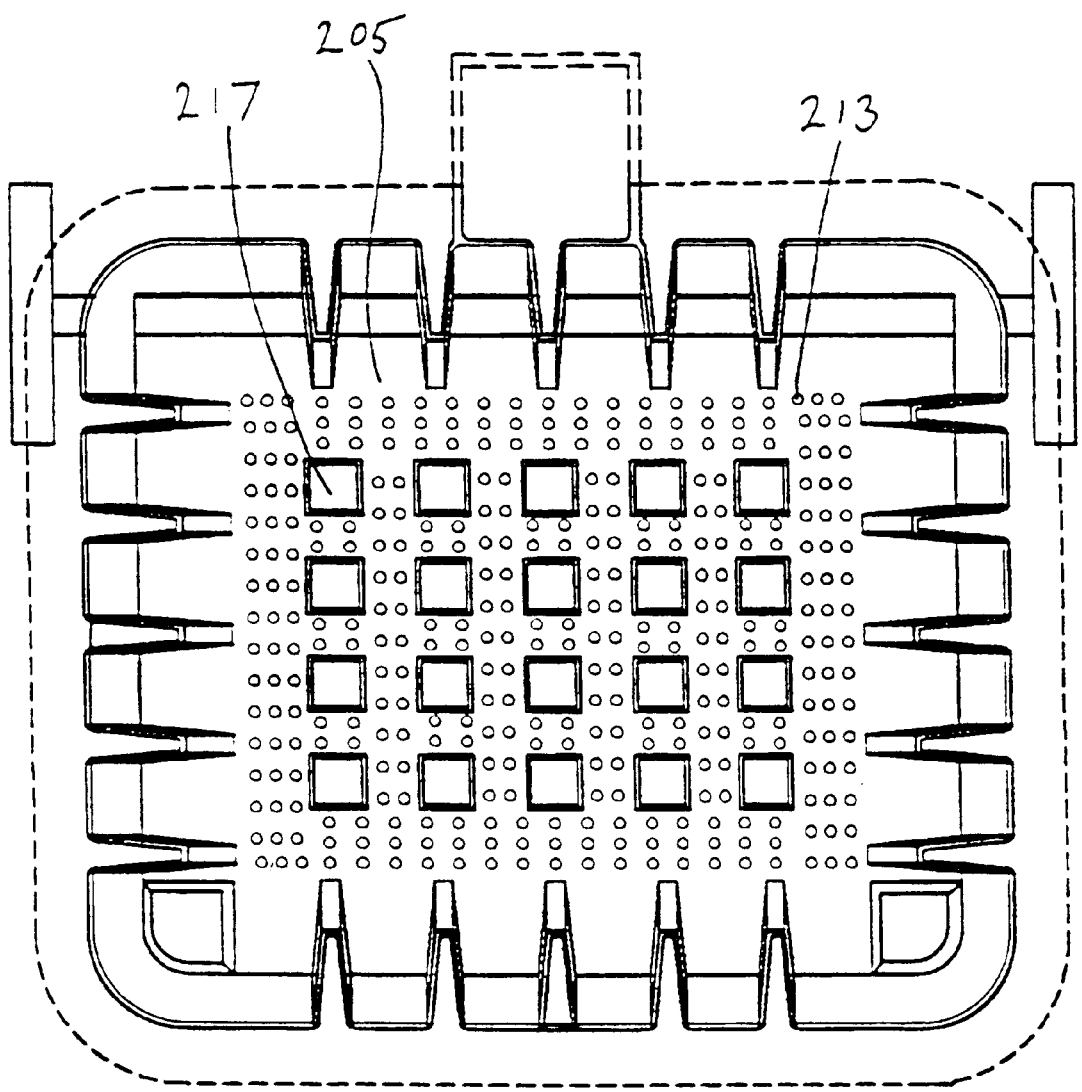
Figure 11:
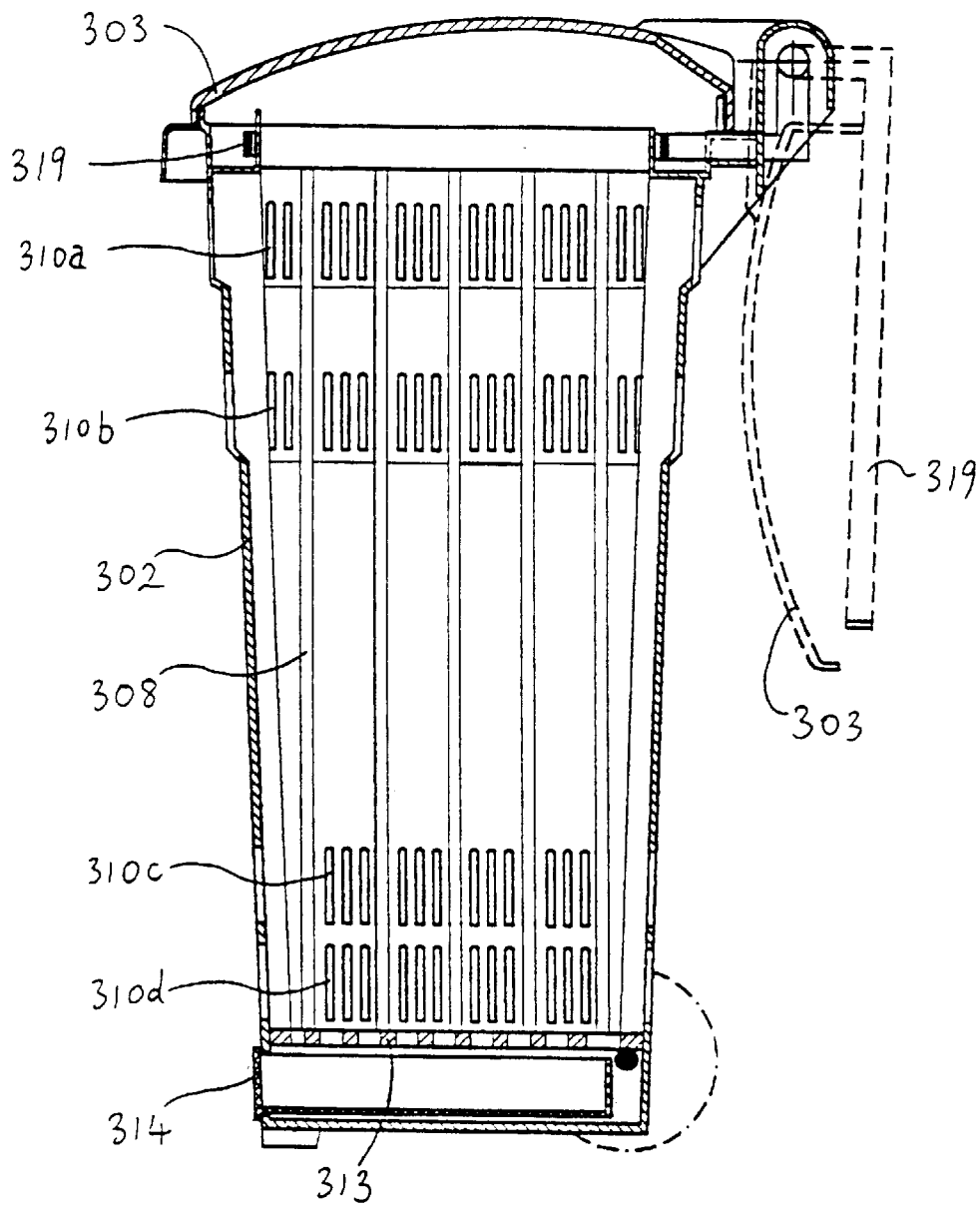
Figure 12:
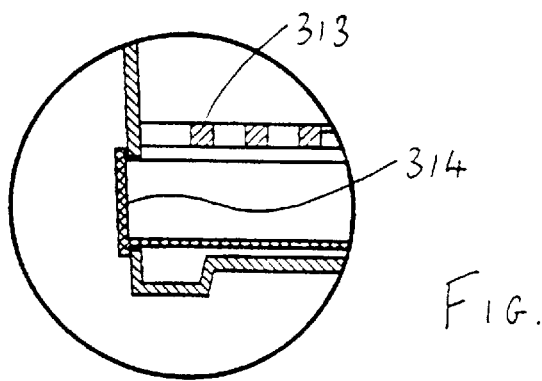

FIG. 3 similarly shows a slice through the container depicted in FIG. 1, but this time on the line Y—Y;

FIG. 4 shows a cut-away diagram of the outer receptacle in a chest configuration;

FIG. 5 shows a side elevation of the lower half of a container in which a ventilated insert has been placed;

FIG. 6 shows the container of FIG. 5 from above with the insert in place;

FIG. 7 shows a cut-away diagram of the outer receptacle in a configuration suitable for a kitchen bin;

FIGS. 8a to 8f are schematic illustrations showing various arrangements of spacers and vents;

FIG. 9 is a sectional elevation of a container according to another embodiment of the invention;

FIG. 10 is a view from above of the container of FIG. 9, but with the lid opened or removed;

FIG. 11 is a sectional elevation of a container according to a still further embodiment of the invention; and FIG. 12 is an enlarged view of a portion of the container of FIG. 11.

FIG. 1 shows a cut-away diagram of the outer receptacle 2 in a wheeled bin configuration which is provided with an openable lid 3, sides 4 and a bottom face 5. The bag 6 is suspended in the outer receptacle and secured at the top of the outer receptacle 2 by suspension means 7. The substantially vertical spacers 8 which run parallel to each other from top to bottom of the sides 4 hold the bag 6, in this embodiment a paper sack made of kraft paper, away from the inside face of the side walls 9 of the outer receptacle 2. Except at the corners between two sides 4 the vents 10 in this embodiment are arranged between each adjacent pair of spacers 8 are placed down the length of the sides as well as the bottom face 5 of the outer receptacle 2. The bag 6 shown in this embodiment is manufactured to a specification in which it is not necessary for its base 11 to be supported by the bottom face 5 of the outer receptacle. In this embodiment the total length of the vents 10 cover typically 50 to 60% of the total length of each side 4 arranged evenly from top to bottom of the container 1 and the width of each vent in this embodiment will be typically 4 mm to stop access to rodents. The spacers 8 in the sides 4 in this embodiment are typically around 15 mm apart. A pair of wheels 15 are provided.

Figure 2:
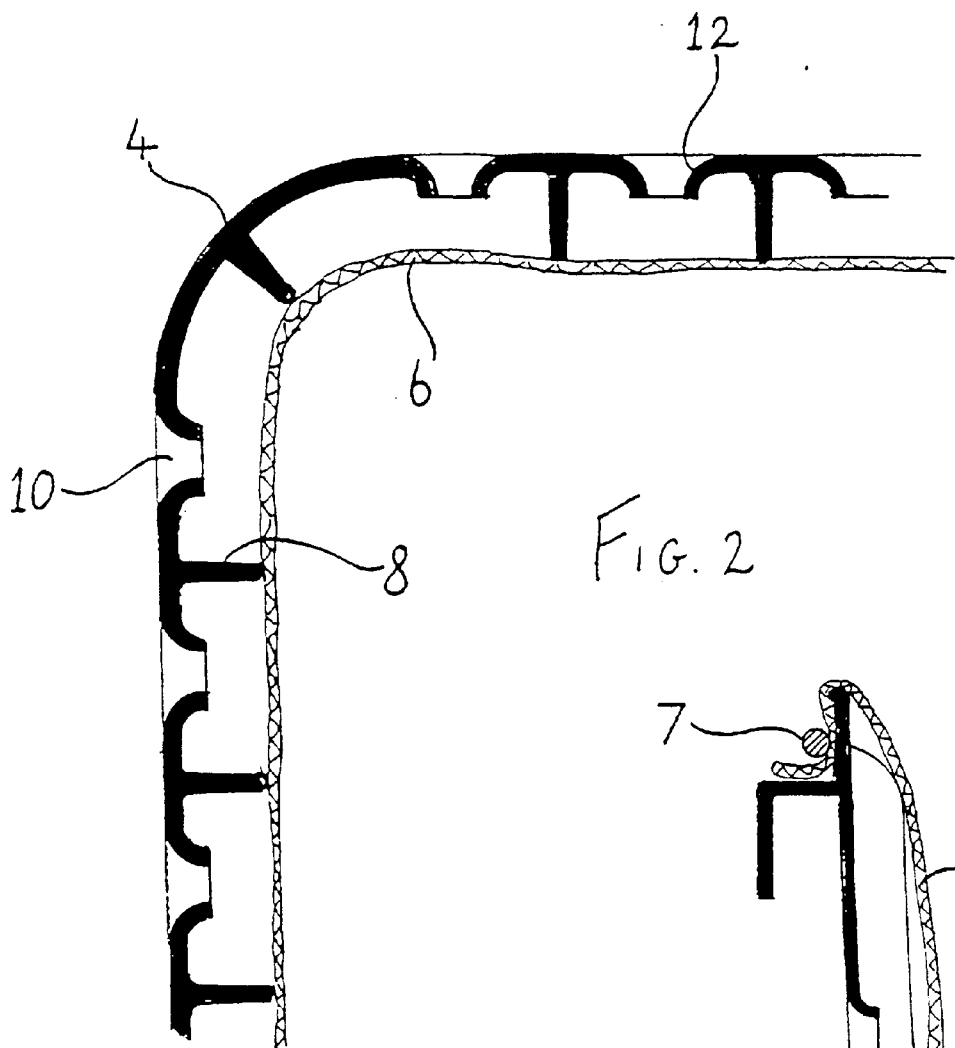
FIG. 2 shows a horizontal slice through the container depicted in FIG. 1 on the line marked A—A.

FIG. 2 shows a horizontal slice through the container depicted in FIG. 1 on the line marked A—A. It shows the side 4 of the outer receptacle, the position of the spacers 8 and the vent 10, and the bag 6 which is being held away from the inside face of the outer receptacle. The radius of each side of the opening 12 is proportionately large to make it difficult for a rodent to gain a purchase to gnaw its way through the outer receptacle 2.

FIG. 3 similarly shows a slice through the container depicted in FIG. 1, but this time on the line Y—Y. It shows a vertical slice through the container demonstrating the position of the vents 10 and spacers 8. The bag 6 is shown retained by suspension means 7 at the mouth of the container and held away from the inside face of the side wall 9 of the container.

FIG. 4 is a container 1 which shows a cut-away diagram of the outer receptacle 2 in a chest configuration, equipped with a hinged lid 3. The spacers 8 and vents 10 are shown evenly distributed along the inside face of the side walls 9 of the outer receptacle 2, with a ventilation grid 13 shown above the pair of removable trays 14 which can be inserted if it is necessary to capture solids or liquids discharged from the material stored in the container. The vents 10 can, if necessary, be contained in the bottom face 5 of the outer receptacle. This embodiment shows the bags 6 placed in the container without the need for any suspension means. For waste materials storage and collection the measurements and the need to consider rodents will apply as in the case of FIG. 1. However, the size of the vents and spacers can be larger for certain industrial uses, dictated by the point loading capacity of the bags in use and degree of ventilation required. In this embodiment wheels 15 at each corner are included.

FIG. 5 shows a side elevation of the lower half of a container 1 in a wheeled bin configuration in which an insert 16 has been placed, enabling the container to be used with a smaller capacity bag. With the insert with vents 10 included, the outer receptacle is able to provide support to the base of a shorter bag 6. In this example, use is made of the vents in the base of the container in retaining the fastening 17 on the insert in place.

FIG. 6 shows the container 1 of FIG. 5 from above with the insert in place. The insert 16 is positioned inside the side wall spacers 8. The insert is shown with vents 10 in its top face enabling substantially the same level of air circulation in the container for the base of the shorter bag.

FIG. 7 shows a cut-away diagram of the outer receptacle 2 in a configuration suitable for a kitchen bin with hinged lid 3 and suspension means 7 for holding the bag 6 open at the top end of the container. In this embodiment the bag 6 is a paper sack which is assumed to be manufactured to a specification in which it is necessary for its base to be supported. The substantially vertical spacers 8 hold the bag away from the inside face of the side walls 9 of the outer receptacle 2 with a regular distribution of vents 10 in between. In this example, the container has been designed with an integral tray 14 to catch any liquids or solids, but also has bottom face 5 vents 10 which ring the tray to bring some ventilation to the base of the bag 6.

Figure 8A:
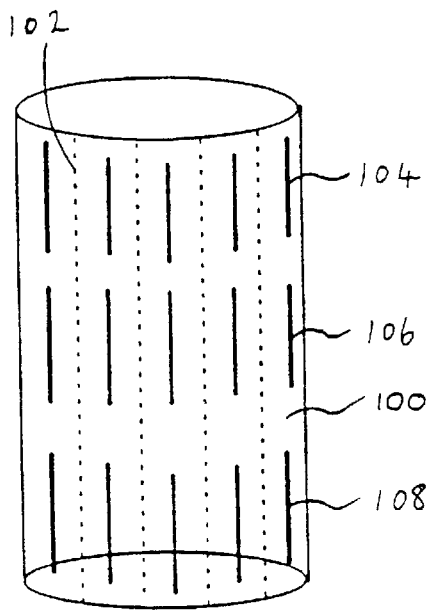

FIGS. 8a to 8f show various arrangements of vents and spacers. In FIG. 8a, the side wall 100 of the container has spacers 102 running from top to bottom, with three rows of vents 104, 106, 108 arranged between the spacers.

Figure 8B:
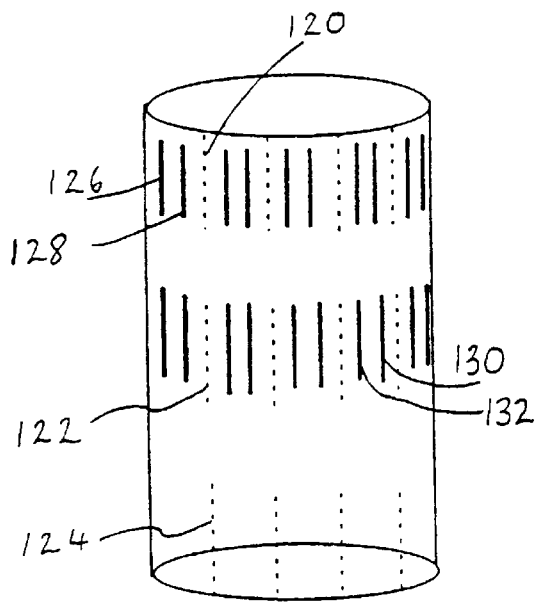

In FIG. 8b, the spacers are discontinuous and form three rows 120, 122, 124, with a pair of vents 126, 128, 130, 132 being located between each pair of adjacent spacers in the upper two rows of spacers 120 and 122.

Figure 8C:
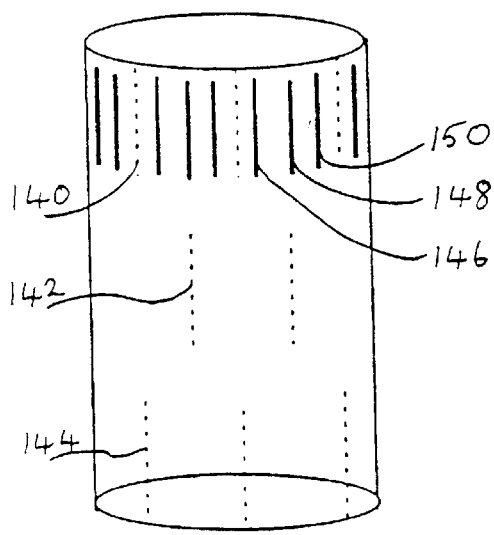

In FIG. 8c, the three rows of spacers 140, 142, 144 are staggered, and vents 146, 148, 150 are located only between the spacers in the upper layer. In this case, there are three vents between each spacer.

Figure 8D:
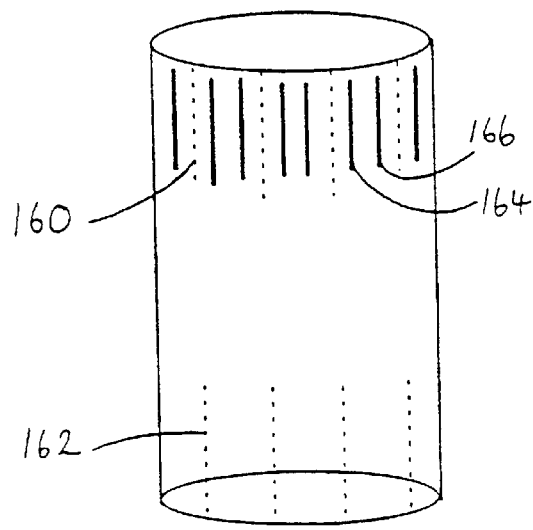

In FIG. 8d, there are only two rows of spacers 160, 162, and the vertical distance between the spacers is approximately one and a half times the height of the spacers. In this embodiment, vents 164, 166 are located between only the top layer of spacers 160.

Figure 8E:
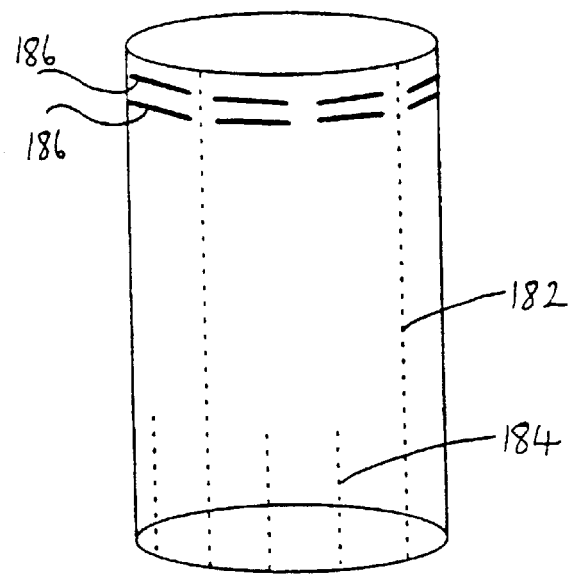

In FIG. 8e, the outer receptacle 180 is provided with both full length spacers 182 and, at the lower end of the receptacle, shorter spacers 184. Horizontally oriented vents 186 are located at the upper end of the receptacle.

Figure 8F:
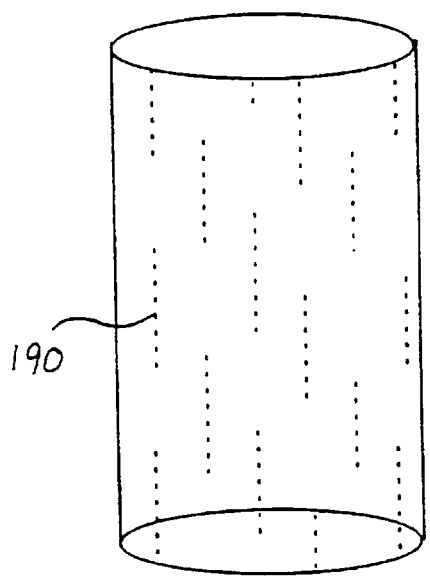

In FIG. 8f, the outer receptacle is provided with spacers 190 which are staggered both in the vertical and horizontal directions. In this embodiment, there are no vents in the side walls of the outer receptacle.

It will be appreciated that in the embodiments shown in FIGS. 8c to 8f, and to some extent also in FIG. 8b, effective ventilation of the container will depend on the presence of vents in the base of the outer receptacle (not shown). Such vents can, of course, also be present in the base of the container shown in FIG. 8a, and indeed preferably are thus present.

FIG. 9 illustrates a further embodiment of the invention in which the outer receptacle 202 is provided with two rows of vents 210, arranged in groups of three and separated by generally vertically aligned spacers 208. The inner receptacle, which can be for example a Kraft paper sack, has been omitted from the drawing to assist clarity. At the lower end of the outer receptacle 202, the bottom wall 205 is provided with a plurality of vent holes 213 interspersed between an array of upstanding spacers 217 of generally rectangular (e.g. square) plan. The spacers 217 serve to space the inner receptacle away from the bottom wall 205 and enable air to pass through the vents 213 and up through the container between the inner and outer receptacles. At the upper end of the receptacle, a lid 203 is provided. Lid 203 is hingedly attached to the outer receptacle and can be opened to allow material to be introduced into the container. Also hingedly attached to the outer receptacle 202 is a retaining ring 219 which serves to retain the inner receptacle in place. In the drawing, the open positions of the lid 203 and retaining ring 219 are shown by means of dotted lines.

A still further embodiment of the invention is illustrated in FIGS. 10 and 11. In this embodiment, only the outer receptacle of which is shown, there are four rows of vents 310a, 310b, 310c and 310d, two rows being arranged around the upper end of the container and two rows being arranged around the lower end of the container. As with the containers of the other embodiments, the container has an array of spacers 308 extending up the inner surface of the outer receptacle 302. At the lower end of the outer receptacle, a ventilation grid 313 having vents 313a permits liquids discharged from the inner receptacle (not shown) to drain into a removable tray 314. The structure of the removable tray and the lower end of the outer receptacle can be seen with greater clarity in FIG. 12 which is an enlarged view of a lower corner of the outer receptacle.

In common with the embodiment of FIG. 9, the outer receptacle is closed at its upper end by means of a lid 303 which is hingedly attached to the outer receptacle. A retaining ring 319, which serves to retain the inner receptacle in place, is also hingedly attached to the outer receptacle and can be pivoted into an open position (as shown by means of the dotted line in FIG. 11) to allow the inner receptacle to be replaced as required.

By virtue of the foregoing properties, the container of the invention is able to exploit the properties of the inner bag by providing an aerobic environment meeting the requirements of the bag and its contents. The container of the invention achieves its object by the careful positioning and sizing of a plurality of vents, allowing the circulation of air in the container, arranged between a plurality of spacers which hold the one or more bags away from the inside face of the walls of the outer receptacle. As indicated above, the bottom of the container can contain a vent or plurality of vents and spacers, which can be combined with one or more integral or detachable trays to catch liquids and/or solids.

It will be appreciated that the foregoing description is merely exemplary and that numerous modifications and alterations can be made to the particular embodiments shown in the drawings without departing from the principles underlying the invention. All such modifications and alterations are intended to be embraced by this Application.

What is claimed is:

1. A container comprising an outer receptacle and, disposed therein, an inner receptacle in the form of a bag; the bag being permeable to gases; the outer receptacle having a plurality of spacers extending inwardly from an inner surface thereof, and a plurality of vents in one or more walls of the outer receptacle; the spacers serving to support the inner bag such that it is spaced apart from the inner surface of the outer receptacle; and the vents serving to allow air to circulate between the bag and the outer receptacle.

2. A container according to claim 1 wherein the outer receptacle has one or more vents formed in at least one wall thereof.

3. A container according to claim 2 wherein the outer receptacle has one or more vents formed in a base thereof.

4. A container according to claim 2 wherein the vents are provided adjacent at least 50% of the spacers.

5. A container according to claim 4 wherein the vents are provided adjacent at least 75% of the spacers.

6. A container according to claim 2 wherein the vents are elongate in form.

7. A container according to claim 6 wherein the vents are arranged in a plurality of substantially horizontal rows around the outer receptacle.

8. A container according to claim 7 wherein the rows are substantially parallel with respect to each other, and are disposed such that the vents are in substantially vertical alignment.

9. A container according to claim 8 wherein the vertical distance between rows of vents is between 0.5 and 3 times the height of each vent in a pair of vertically adjacent rows.

10. A container according to claim 9 wherein the horizontal distance between adjacent vents in a row of vents is between 1 and 10 times the width of the vent.

11. A container according to claim 2 wherein the configuration and arrangement of the spacers is such that, together with the inner surface of the outer receptacle and an outer surface of the inner receptacle, elongate ducts are created which serve to channel convection currents between the inner and outer receptacles.

12. A container according to claim 11 wherein the elongate spacers extend in a substantially upwards direction.

13. A container according to claim 12 wherein said spacers include discontinuities, and wherein the spacers are arranged in rows in substantially vertical alignment.

14. A container according to claim 1 wherein the spacers are in the form of elongate ribs.

15. A container according to claim 1 wherein the spacers are from 0.25 cm to 8 cm.

16. A container according to claim 1 wherein the spacers have a width varying from 0.25 cm to 8 cm.

17. A container according to claim 1 wherein the outer receptacle is provided with a base having at least one vent formed therein.

18. A container according to claim 1 wherein the inner receptacle is formed from a paper material, or a permeable polymeric or composite material.

19. A container according to claim 1 wherein the outer receptacle comprises suspension means for securing the inner receptacle to an upper end thereof, the suspension means being arranged to hold the inner receptacle in an open configuration.

20. A container according to claim 1 wherein the container includes a base, said base being provided with one or more spacer elements for supporting the bag.

21. A container according to claim 1 wherein at least one of the outer receptacle and the bag includes means for repelling insects or small creatures.

* * * * *